United States Patent Office 3,793,237
Patented Feb. 19, 1974

3,793,237
OPEN-CELL RIGID POLYETHER
POLYURETHANE FOAM
John Watkinson, Shrub Oak, N.Y., assignor to Union
Carbide Corporation, New York, N.Y.
No Drawing. Filed Aug. 11, 1972, Ser. No. 279,881
Int. Cl. C08g 22/14, 22/46
U.S. Cl. 260—2.5 AH                                      14 Claims

ABSTRACT OF THE DISCLOSURE

Process for the production of open-cell rigid polyether polyurethane foam employing as the cell-opening agent a siloxane-oxyalkylene $(AB)_n$ block copolymer and the cured foams produced thereby.

BACKGROUND OF THE INVENTION

This invention relates to a process for the production of rigid polyurethane foam. More particularly this invention relates to a process for the production of predominately open-cell rigid polyether polyurethane foam.

The production of rigid polyether polyurethane foam and in general comprises foaming and curing a mixture of a polyether polyol, a polyfunctional isocyanate, a blowing agent and a catalyst, which mixture may contain optional ingredients such as a foam stabilizer, a flame retardant, and the like. It is also well known that such rigid polyether polyurethane foams are predominately closed-cell foams. While such closed-cell foams have found wide acceptance in the art, in general they are not advantageously employable in areas where thermal dimensional stability is important because of possible cold shrinkage or warping due to hot spots, nor in applications which require good sound-absorbing properties or filtration.

In order to provide rigid polyether polyurethane foam which might overcome the above disadvantages attendant with closed-cell foams, atempts have been made to produce open-cell rigid polyurethane foams by employing disruptive physical forces or by employing various cell opening agents to lower, as much as possible, the closed-cell content of the foams as shown by U.S. Pats. 3,433,-752 and 3,454,504.

It has now been surprisingly discovered that predominately open-cell rigid polyether polyurethane foam can be produced by employing as the cell-opening agent an organosilicone polymer.

Accordingly it is an object of this invention to provide predominately open-cell rigid polyether polyurethane foams. It is also an object of this invention to provide a process for the production of said foams. Other objects and advantages of this invention will become readily apparent from the following description and appended claims.

SUMMARY OF THE INVENTION

More particularly the instant invention is directed to a process for preparing an open-cell rigid polyether polyurethane foam having a closed-cell content of less than 50 percent which comprises foaming and curing a mixture comprising:

(I) A polyether polyol;

(II) An organic polyisocyanate, said polyether and polyisocyanate, taken together, being present in the mixture in a major amount and said polyether and polyisocyanate being present in the relative amounts required to produce the polyurethane foam;

(III) A blowing agent in a minor amount sufficient to foam the mixture;

(IV) A catalytic amount of a catalyst for the production of the polyurethane foam; and (V) As the cell-opening agent a minor amount of an essentially linear siloxane-oxyalkylene $(AB)_n$ type copolymer said amount being sufficient to provide the polyurethane foam with a closed-cell content of less than 50 percent.

DESCRIPTION OF THE PREFERRED EMBODIMENTS

The preparation of rigid polyether polyurethane foam as well as the necessary ingredients for said process is well known in the art and the instant invention is not limited to any particular procedure nor to any particular class of necessary ingredients, i.e. polyether polyol, polyfunctional isocyanate, blowing agent and catalyst.

Any known procedural technique for preparing rigid polyether polyurethane foams such as the prepolymer method or one-shot method and the like, may be employed by the instant invention, although generally it is preferred to employ the conventional one-shot method.

Any polyether polyol (and of course it is understood that the term polyether polyol as used herein includes mixtures of such polyethers) suitable for preparing rigid polyether polyurethane foam may be employed in the process of this invention. Such polyethers as well as methods for their manufacture are well known in the art.

As a general guide line such polyethers have an average molecular weight of about 200 to about 1500 preferably about 250 to about 800, and a hydroxyl number of about 200 to about 1000, preferably about 300 to about 600. The hydroxyl number is defined as the number of milligrams of potassium hydroxide required for the complete neutralization of the fully acetylated derivative prepared from one gram of polyether polyol. The hydroxyl number can also be defined by the equation:

$$OH = \frac{56.1 \times 1000 \times f}{M.W.}$$

OH=hydroxyl number of the polyol;
$f$=average functionality, that is average number of hydroxyl groups per molecule of polyol;
M.W.=average molecular weight of the polyol.

Illustrative polyethers include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide useful polyethers include glycerol, trimethylolpropane, 1,2,6 - hexanetriol, pentaerythritol, sorbitol, glycosides, such as methyl, ethyl, propyl, butyl and 2 - ethylhexyl arabinoside, xyloside, fructoside, glucoside, rhammoside, and the like, and polyethers prepared by the reaction of alkylene oxides with sucrose.

Further included are polyethers prepared by reacting a 1,2-alkylene oxide such as ethylene oxide, propylene oxide, butylene oxide or mixtures thereof with mono-nuclear polyhydroxy-benzenes such as resorcinol, pyrogalol, phloroglucinol, hydroquinone, 4,6-di - t - butyl-catechol, catechol, orcinol, methylphoroglucinol, 2,5,6 - trimethylresorcinol, 4-ethyl-5,6-dimethylresorcinol, n-hexylresorcinol, 4-chloro-5-methylresorcinol, and the like; polyethers prepared by reacting 1,2-alkylene oxides or mixtures thereof with fused ring systems such as 3-hydroxy-2-naphthol, 6,7-dihydroxy-1-naphthol, 2 - hydroxy-1-naphthol, 2,5-dihydroxy - 1 - naphthol, 9,10-dihydroxyanthracene, 2,3-dihydroxyphenanthrene, and the like.

Other polyethers which can be employed are those obtained by reacting 1,2-alkylene oxides or mixtures thereof with polynuclear hydroxybenzenes such as the various di, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p-hydroxyphenyl)methane and the various diphenols and diphenylol methanes disclosed in U.S. Pats. Nos. 2,506,486 and 2,744,882, respectively.

Exemplary triphenylol compounds which can be employed include the alpha,alpha,omega-tris(hydroxyphenyl)alkanes such as:

1,1,3-tris(hydroxyphenyl)ethanes;
1,1,3-tris(hydroxyphenyl)propanes;
1,1,3-tris(hydroxy-3-methylphenyl)propanes;
1,1,3-tris(dihydroxy-3-methylphenyl)propanes;
1,1,3-tris(hydroxy-2,4-dimethylphenyl)propane;
1,1,3-tris(hydroxy-2,5-dimethylphenyl)propanes;
1,1,3-tris(hydroxy-2,6-dimethylphenyl)propane;
1,1,4-tris(hydroxyphenyl)butanes;
1,1,4-tris(hydroxyphenyl)-2-ethylbutanes;
1,1,4-tris(dihydroxyphenyl)butanes;
1,1,5-tris(hydroxyphenyl)-3-methylpentanes;
1,1,8-tris(hydroxyphenyl)octanes;
1,1,10-tris(hydroxyphenyl)decanes;

and the like.

Tetraphenylol compounds which can be reacted with 1,2-alkylene oxides include the alpha,alpha,omega,omega-tetrakis(hydroxyphenyl)alkanes such as:

1,1,2,2-tetrakis(hydroxyphenyl)ethanes;
1,1,3,3-tetrakis(hydroxy-3-methylphenyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)-2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimethylphenyl)octanes;
1,1,10,10-tetrakis(hydroxyphenyl)decanes;

and the corresponding compounds which contain substituent groups in the hydrocarbon chain such as:

1,1,6,6-tetrakis(hydroxyphenyl)-2-hydroxyhexanes;
1,1,6,6-tetrakis(hydroxyphenyl)-2-hydroxy-5-methylhexanes;
1,1,7,7-tetrakis(hydroxyphenyl)-3-hydroxyheptanes;

and the like.

Other particularly useful polyethers which can be employed are the ethylene oxide propylene oxide and butylene oxide adducts of phenol-formaldehyde condensation product materials such as the novolaks.

Novolaks are mixtures of polynuclear compounds of the diphenylmethane type of structure such as 4,4'-dihydroxydiphenylmethane and 2,4' - dihydroxydiphenylmethane. Such compounds are free from methylol groups and are formed by the Baeyer reaction of phenol and formaldehyde. In a typical synthesis, novolaks are prepared by condensing one mole of phenolic compounds, such as phenol or cresol, with 0.8 mole of an aldehyde, such as formaldehyde or furfural, under acid conditions at a temperature around 160° C. to 170° C. The polynuclear products frequency contain four to eight units and can contain twelve or more units. Novolaks, as such, are non-curable, thermoplastic resins.

Further included are polyethers prepared by reacting one or more of the alkylene oxides above noted with acyclic polyamines such as ethylenediamine, propylenediamine, butylenediamine, pentylenediamine, hexylenediamine, octylenediamine, nonylenediamine, decylenediamine, polyalkylene polyamines such as diethylenetriamine, triethylenetriamine, tetraethylenepentamine, dipropylenetriamine, and the like. A particularly suitable polyether is the propylene oxide addition product of diethylenetriamine.

Other suitable polyethers include the 1,2-alkylene oxide derivatives of mononuclear primary amines such as; o-, m-, and p-phenylenediamine; 2,4- and 2,6-diaminotoluene; 2,6-diamino-p-xylene; 4,6-diamino-m-xylene; 2,4-diamino-m-xylene; 3,5-diamino-o-xylene; isohexyl-p-phenylenediamine; 3,5-diaminotoluene, and the like; polynuclear and fused aromatic polyamines such as 1,4-naphthylene-diamine; 1,5-naphthylenediamine; 1,8-naphthylenediamine; benzidine, toluidine; 4,4'-methylenedianiline; 3,3'-dimethoxy-4'-4'-biphenyldiamine; 3,3'-dichloro-4,4'-biphenyldiamine; 3,3'-dimethyl-3,3'-biphenyldiamine; 4,4'-ethylenedianiline; 4,4'-ethylidenedianiline; 1-fluorenamine; 2,5 - fluorendiamine; 2,7 - fluorenediamine; 1,4-anthradiamine; 3,3'-diphenyldiamine; 3,4-biphenyldiamine; 9,10-diaminophenanthrene and 4,4-diaminoazobenzene.

Higher functional mono- and polynuclear polyamines which also can be reacted with 1,2-alkylene oxides to provide useful polyether starting materials include 2,4,6-triaminotoluene; 2,3,5-triaminotoluene; 5,6-diaminoacenaphthene; 4,4',4''-methylidynetianiline, 3,5-diaminobenzoic acid; triaminodiphenyl ethers and sulfides such as 2,4,4'-triaminodiphenyl ether; 2,3',4-triamino-4'-methyldiphenyl ether; 2,3',4-triamino-4'-methoxydiphenyl ether; and polyamines obtained by interaction of aromatic monoamines with formaldehyde or other aldehydes.

Any organic polyisocyanate (and of course it is understood that the term organic polyisocyanate as used herein includes mixtures of such isocyanates) suitable for preparing rigid polyether polyurethane foam may be employed in the process of this invention. Such organic polyisocyanates as well as methods for their production are well known in the art. Illustrative polyisocyanates are those represented by the general formula:

$$Q(NCO)_i$$

wherein $i$ is in integer of two or more and Q is an organic radical having the valence of $i$. Q can be a substituted or unsubstituted hydrocarbon group (e.g. an alkylene or an arylene group). Q can be a group having the formula Q'—Z—Q' where Q' is an alkylene or arylene group and Z is —O—, —O—Q'—, —CO—, —S—, —S—Q'—S—, or —SO$_2$—. Examples of such compounds include hexamethylene diisocyanate, 1,8-diisocyanato-p-menthane, xylxyene diisocyanate, 

1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, and isopropylbenzene-alpha-4-diisocyanate.

Q can also represent a polyurethane radical having a having a valence of $i$ in which case $Q(NCO)_i$ is a composition conventionally known as a prepolymer. Such prepolymers are formed by reacting a stoichiometric excess of a polyisocyanate as set forth hereinbefore and hereinafter with a polyether polyol as set forth herein. Usually, for example, the polyisocyanate is employed in proportions of from about 30 percent to about 200 percent stoichiometric excess, the stoichiometry being based upon equivalents of isocyanate group per equivalent of hydroxyl in the polyol.

Further included among the polyisocyanates useful in this invention are dimers and trimers of isocyanates and diisocyanates and polymeric diisocyanates such as those having the general formula:

$$[Q''(NCO)_i]_j$$

in which $i$ and $j$ ore each integers of two or more, and $Q''$ is a polyfunctional organic radical, and/or, as additional components in the mixtures, compounds of the general formula:

$$L(NCO)_i$$

in which $i$ is one or more and L is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; isocyanates derived from sulfonamides ($QSO_2NCO$), cyanic acid, and thiocyanic acid, and compounds containing a metal —NCO such as tributyltinisocyanate.

Another preferred class of polyisocyanates useful in the preparation of the rigid polyether polyurethane foams in accordance with the process of this invention are the polyisocyanates of the aniline-formaldehyde polyaromatic type which are produced by phosgenation of the polyamine obtained by acid-catalyzed condensation of aniline with formaldehyde. Poly(phenylmethylene) polyisocyanates of this type are available commercially under such trade names as PAPI, AFPI, Mondur MR, Isonate 390P, NCO–120 and NCO–20. These products are low viscosity (50–500 centipoises at 25° C.) liquids having average isocyanato functionalities in the range of about 2.25 to about 3.2 or higher, depending upon the specific aniline-to-formaldehyde molar ratio used in the polyamine preparation.

More specifically the polyisocyanate component employed in the process of this invention include the following specific compounds as well as mixtures of two or more of them: 2,4-tolylene diisocyanate, 2,6-tolylene diisocyanate, crude tolylene diisocyanate, bis(4-isocyanatophenyl)methane, polyphenylmethylene polyisocyanates that are produced by phosgenation of anilineformaldehyde condensation products, dianisidine diisocyanate,
toluidine diisocyanate,
xylylene diisocyanate,
bis(2-isocyanatoethyl) fumarate,
bis(2-isocyanatoethyl) carbonate,
1,6-hexamethylene-diisocyanate,
1,4-tetramethylene-diisocyanate,
1,10-decamethylene-diisocyanate,
cumene-2,4-diisocyanate,
4-methoxy-1,3-phenylene-diisocyanate,
4-chloro-1,3-phenylenediisocyanate,
4-bromo-1,3-phenylene-diisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
bis 5,6-(2-isocyanatoethyl)bicyclo[2.2.1] hept-2-ene,
benzidinediisocyanate,
4,6-dimethyl 1,3-phenylenediisocyanate,
9,10-anthracenediisocyanate,
4,4'-diisocyanatodibenzyl,
3,3-dimethyl-4,4'-diisocyanatodiphenylmethane,
2,6-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluoroenediisocyanate,
1,8-naphthalenediisocyanate,
2,6-diisocyanatobenzfuran,
2,4,6-toluenetriisocyanate, and many other organic polyisocyanates that are known in the art, such as those that are disclosed in an article by Siefken, Ann. 562, 75 (1949). In general, the aromatic polyisocyanates are preferred because of their greater reactivity.

The amount of polyisocyanate employed is not critical and of course need only be that which is sufficient along with the polyether polyol used to form the rigid polyether polyurethane foam product desired. Said amounts will of course vary with the nature of the foam product desired and the polyether polyol employed. In general the total —NCO equivalent to the total active hydrogen equivalent of polyether polyol used should be such as to provide a ratio of 0.8 to 2.0 equivalents of —NCO per equivalent of active hydrogen of the polyether polyol, and preferably a ratio of about 1.0 to 1.5 equivalents of —NCO per active hydrogen although higher ratios can be used if desired.

Any blowing agent (and of course it is understood that the term blowing agent as used herein includes mixtures of such agents) suitable for preparing rigid polyether polyurethane foam may be employed in the process of this invention. Such blowing agents as well as methods for their manufacture are well known in the art. For example, foaming can be accomplished by employing a minor amount of blowing agent such as water (e.g. about 0.5 to 5.0 weight percent of water, based on the total weight of the reaction mixture), the reaction of water and isocyanate generating carbon dioxide, or through the use of other blowing agents which are vaporized by the exotherm of the isocyanatepolyol reaction, or by a combination of the two methods. All these various methods are well known in the art. Illustrative of such blowing agents include water, methylene chloride, inert gases, and liquified gases which have boiling points below 80° F. and above —60° F. and which vaporize at or below the temperature of the foaming mass. Suitable liquified gases include aliphatic and cycloaliphatic fluorocarbons which are at least partially fluorinated and may also be otherwise halogenated. Illustrative fluorocarbon blowing agents include trichlorofluoromethane, dichlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1-chloro-2-fluoroethane, 1,1,2 - trichloro - 1,2,2 - trifluoroethane, 1,1,1-trifluoro-2-fluoro-3,3-difluoro-4,4,4-trifluorobutane, hexafluorocyclobutene, octafluorocyclobutane, and the like. Other blowing agents include low boiling hydrocarbons such as butane, pentane, hexane, and the like. A further class of blowing agents includes thermally-unstable compounds which liberate gases upon heating, such as N,N'-dimethyl-dinitrosoterephthalamide. Generally it is preferred to employ water, or a fluorocarbon or a combination of water and a fluorocarbon as the blowing agent.

The amount of blowing agent employed is not critical and of course need only be sufficient to foam the reaction mass. Said amount will vary with factors such as the density that is desired in the foamed product. As a general guide for 100 grams of reaction mixture containing an average NCO/OH ratio of about 1:1, about 0.005 to 0.3 mole of gas is used to provide densities ranging from 30 pounds to 1 pound per cubic foot.

Any catalyst (and of course it is understood that the term catalyst as used herein includes mixtures of such catalysts) suitable for preparing rigid polyether polyurethane foam may be employed in the process of this invention. Such catalysts as well as methods for their preparation are well known in the art. Catalysts suitable for accelerating the polyether-isocyanate reaction include amines and a wide variety of metal compounds, both inorganic metal compounds and metal compounds which contain organic groups. Particularly useful catalysts are tertiary amines and organo-tin compounds, especially mixtures of such amine and tin compounds.

Among the organo-tin compounds that deserve particular mention are stannous acylates such as stannous acetate, stannous octoate, stannous laurate, stannous oleate and the like; stannous alkoxides such as stannous butoxide, stannous 2-ethylhexoxide, stannous phenoxide, o-, m- and p-stannous cresoxides, and the like; dialkyl tin salts of carboxylic acids, e.g., dibutyltin diacetate, dibutyltin dilaurate, dibutyltin maleate, dilauryltin diacetate, dioctyltin diacetate, and the like. Similarly, there can be used a trialkyltin hydroxide, dialkyltin oxide or dialkyltin chloride. Examples of these compounds include trimethyltin hydroxide, tributyltin hydroxide, trioctyltin hydroxide, dibutyltin oxide, dioctyltin oxide, dilaurytin oxide, dibutyltin dichloride, dioctyltin dichloride, and the like.

The tertiary amines which are useful as catalysts in the formulations of this invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N - ethylmorpholine, N - octadecylmorpholine (N - cocomorpholine), N,N,N',N'-tetramethylethylenediamine, N,N,N',N'-tetramethyl-1,3-propanediamine, triethylenediamine (1,4-diazabicyclo[2.2.2]octane), triethylenetetramine, N,N - dimethylbenzylamine, N,N - diethylbenzylamine, N-ethylhexamethyleneamine, N-ethylpiperidine, alpha-methylbenzyldimethylamine, dimethylhexadecylamine, 3-methylisoquinoline, dimethylcetylamine, and isocyanates and metal compounds containing tertiary nitrogen atoms.

Typical tertiary amines containing active hydrogen atoms reactive with isocyanate groups include dimethylethanolamine, triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine, diethylenetriamine, and the like. Still other tertiary amines containing active hydrogen atoms reactive with isocyanate groups include polyesters based on polyols such as illustrated above including triethanolamine, triisopropanolamine, N-alkyl diethanolamines, and the like, as well as polycarboxylic acids containing tertiary nitrogen atoms.

Other catalysts include metal organic compounds of lead, arsenic, antimony and bismuth compounds characterized by the presence therein of a direct carbon-to-metal bond; organic halides of titanium; the inorganic halides of tetravalent tin, arsenic, antimony, bismuth and titanium; poly-stannates; tin, titanium and copper chelates; and mercury salts. Representative members of this class of catalysts are stannic chloride, stannic bromide, stannic iodide, stannic fluoride, isopropoxysteoroxy polystannate, hydroxysteoroxy polystannate, tin chelates such as bis-(acetylacetone)tin dichloride, arsenic trichloride, antimony trichloride, antimony pentachloride, antimony tributoxide, bismuth trichloride, titanium tetrachloride, bis-(cyclopentadienyl)titanium difluoride, titanium chelates such as octylene glycol titanate, dioctyl lead dichloride, dioctyl lead diacetate, dioctyl lead oxide, trioctyl lead chloride, trioctyl lead hydroxide, trioctyl lead acetate, copper chelates such as copper acetylacetonate, mercurous chloride, mercuric acetate, tributyl arsine, triphenyl stibine, trioctylbismuthine, octylarsine, phenyldimercaptoarsine, butyldichlorobismuthine, triphenylstibine iodide cyanide, isoamylarsenic disulfide, triethylstibine oxide, octylarsonic acid, dibutylstibinic acid, phenylarsenic dilaurate, butylbismuth dibenzenesulfonamide, arsenopropane, and bis(dibutylbismuth)oxide.

The amount of catalyst employed is not critical and of course need only be that catalytic amount sufficient to catalyze the reaction. Such an amount should normally fall within the range of about 0.05 weight percent to about 6 weight percent based on the weight of the polyether polyol.

The cell-opening agents which may be employed in the process of the instant invention are essentially high molecular weight linear siloxane-oxyalkylene $(AB)_n$ copolymers wherein $n$ is an integer, each A is a siloxane block and each B is a polyoxyalkylene block said blocks being linked by a divalent atom or a divalent group.

Said high molecular weight siloxane-polyoxy-alkylene block copolymers may be divided into two classes (1) hydrolyzable block copolymers, i.e., those wherein the siloxane blocks and the polyoxyalkylene blocks are linked by silicon to oxygen to carbon linkages, and (2) non-hydrolyzable (hydrolytically stable) block copolymers, i.e., those wherein the siloxane blocks and polyoxyalkylene blocks are linked by silicon to carbon linkages. The preferred copolymer surfactants are those of the hydrolyzable type.

The siloxane block in the linear copolymers of this invention is a linear siloxane polymer or chain of recurring siloxane units ($-R_2SiO-$), and is illustrated by the average formula $-(R_2SiO)_x$, for the hydrolyzable block copolymers and by the average formula $-(R_2SiO)_aR_2Si-$ for the non-hydrolyzable block copolymers, wherein R is a monovalent hydrocarbon group, $x$ is an integer of at least 7 and $a$ is an integer of at least 6. The average molecular weight of each siloxane block of said siloxane-polyoxyalkylene copolymers ranges from about 500 to about 10,000. Moreover, the monovalent hydrocarbon radicals need not be identical throughout the siloxane block, but can differ from siloxane unit to siloxane unit and can even be different within a single siloxane unit.

Illustrative of the monovalent hydrocarbon groups that are represented by R above are alkyl groups (such as, methyl, ethyl, propyl, isopropyl, butyl, pentyl, hexyl, octyl, decyl, dodecyl, octadecyl, eicosyl, and the like); aryl groups (such as, phenyl, naphthyl, and the like); aralkyl groups (such as, benzyl, phenylethyl, and the like); alkaryl groups (such as, tolyl, xylyl, and the like); and cycloalkyl groups (such as cyclohexyl, and the like). In the hydrolyzable copolymers R can also represent alkenyl groups (such as vinyl, allyl and the like) and cycloalkenyl groups (such as cyclohexenyl and the like). If desired, such groups can contain substituents so long as they do not adversely affect the performance for which the copolymers are intended. Preferably, said hydrocarbon radicals are free from aliphatic unsaturation and contain from 1 to 20 carbon atoms, while lower alkyl and phenyl radicals are most preferred. Especially preferred siloxane blocks are those consisting essentially of dimethylsiloxane units, i.e. $-(Me_2SiO)_x$ wherein $x$ is an integer of at least 7 and $-(Me_2SiO)_aMe_2Si-$ wherein $a$ is an integer of at least 6.

The polyoxyalkylene block of said linear block copolymers is a linear predominantly oxyalkylene polymer comprised of recurring oxyalkylene units, ($-C_nH_{2n}O-$), and is illustrated by the average formula $-(C_nH_{2n}O)_y$, wherein $n$ is an integer from 2 to 4 inclusive and $y$ is an integer of at least four. The average molecular weight of each polyoxyalkylene block of said siloxane-polyoxyalkylene copolymers ranges from about 300 to about 10,000. Moreover, the oxyalkylene units are not necessarily identical throughout the polyoxyalkylene block, but can differ from unit to unit. A polyoxyalkylene block, for example, can be comprised of oxyethylene units ($-C_2H_4O-$); oxypropylene units ($-C_3H_6O$); or oxybutylene units ($-C_4H_8O$); or mixtures thereof. Preferably the polyoxyalkylene block consists essentially of oxyethylene units or oxypropylene units and most preferably of a mixture oxyethylene and oxypropylene units having an oxyethylene content of about 30 to about 75 weight percent and an oxypropylene content of about 70 to about 25 weight percent, based on the total amount of oxyalkylene units in the block.

As is apparent to one skilled in the art at least one end of each polyoxyalkylene block of the linear $(AB)_n$ block copolymers is linked to a siloxane block by a divalent atom or a divalent group. This linkage between the two different blocks is readily apparent and determined by the reaction employed to produce the siloxane-polyoxyalkylene block copolymer, as explained more fully below. Moreover, as is also apparent to one skilled in the art, the linear $(AB)_n$ block copolymers are endblocked. Such endblockers are inconsequential in terms of their amount and effect on the block copolymers and are normally and preferably the residual reactive groups of the polyoxyalkylene polymer and/or siloxane polymer reactants used to produce the linear block $(AB)_n$ copolymers. For example, the linear hydrolyzable $(AB)_n$ block copolymers of this invention can be prepared by the poly-condensation reaction of polyoxyalkylene diols with dialkylamino terminated dialkylsiloxane fluids thus resulting in a copolymer wherein the polyoxyalkylene blocks and siloxane blocks are linked through an oxygen atom (silicon to oxygen to carbon linkages) and the endblocking groups being selected from the group consisting of hydroxy and/or dialkylamino(dialkyl)siloxy groups. Of course it is to be understood that the linear block copolymers may be "capped" by converting such reactive groups to less reactive groups (e.g. to convert dimethyl amino groups to alkoxy groups) by known methods. Moreover, where a catalyst is used in the production of the linear block copolymer, the block copolymer may be possibly endblocked with a catalyst residue. Endblocking by impurities is also a possibility, e.g. by monofunctional impurities, e.g. monols, which might be present in the materials used to prepare the copolymers of this invention. To the same extent it is understood that the instant linear copolymers encompass any branching due to trifunctional impurities, e.g. triols.

The linear siloxane-polyoxyalkylene block copolymers can have an average molecular weight of about 30,000 on up to about 350,000 or higher. The upper limit is not critical, its value merely being dependent upon the practicalities of process limitations in preparing such high molecular weight $(AB)_n$ type polymers. The siloxane blocks of said block copolymers can constitute about 20 to about 50 weight percent of the block copolymer, while the polyoxyalkylene blocks can constitute about 80 to about 50 weight percent of the block copolymer. Preferably the hydrolyzable type $(AB)_n$ polymers have an average molecular weight of at least about 65,000 and most preferably at least about 100,000, while the non-hydrolyzable type $(AB)_n$ polymers have an average molecular weight of at least about 30,000.

It is to be understood that while said $(AB)_n$ block copolymers of this invention can be discrete chemical compounds they are usually mixtures of various discrete block copolymers species due at least in part to the fact that the siloxane and polyoxyalkylene reactants used to produce said $(AB)_n$ block copolymers are themselves usually mixtures. Moreover, while a single $(AB)_n$ block copolymer can be employed as the cell opening agent, mixtures of two or more different $(AB)_n$ block copolymers can also be employed if desired.

More specifically said hydrolyzable linear siloxane-polyoxyalkylene block copolymers preferably consist essentially of (A) at least four linear siloxane blocks consisting essentially of dihydrocarbylsiloxane groups; and (B) at least four linear polyoxyalkylene blocks, said siloxane blocks and polyoxyalkylene blocks being linked by silicon to oxygen to carbon linkages, the average molecular weight of each siloxane block being from about 500 to about 10,000, the average molecular weight of each polyoxyalkylene block being from about 300 to about 10,000, the siloxane blocks constituting from about 20 to about 50 weight percent of the block copolymer, the polyoxyalkylene blocks constituting from about 80 to about 50 weight percent of the block copolymer and the block copolymer having an average molecular weight of at least about 65,000.

Thus the preferred high molecular weight linear hydrolyzable siloxane-polyoxyalkylene block copolymers can be represented by the average formula $$[(R_2SiO)_x(C_nH_{2n}O)_y]_d$$

wherein R represents a monovalent hydrocarbon radical free from aliphatic unsaturation; $n$ is an integer of from 2 to 4 inclusive; $x$ is an integer of at least 7; $y$ is an integer of at least 4; $d$ is an integer of at least 4; the average molecular weight of each siloxane block being from about 500 to about 10,000; the average molecular weight of each polyoxyalkylene block being from about 300 to about 10,000; said siloxane and polyoxyalkylene blocks being linked by the silicon to oxygen to carbon linkages; the siloxane blocks constituting from about 20 to about 50 weight percent of the copolymer; the polyoxyalkylene blocks constituting about 80 to about 50 weight percent of the copolymer; and the block copolymer having an average molecular weight of at least about 65,000.

Of course it is understood that the chosen values of R, $n$, $x$, $y$ and $d$ must be such, that in any given block copolymer as defined herein, they coincide with the particular average weight values of the siloxane blocks, the polyoxyalkylene blocks and the copolymer itself.

The most preferred high molecular weight linear hydrolyzable siloxane-polyoxyalkylene block copolymers can be represented by the average formula $$[(R_2SiO)_x(C_nH_{2n}O)_y]_d$$

wherein R represents a monovalent hydrocarbon radical free from aliphatic unsaturation, preferably lower alkyl, especially methyl; wherein $(C_nH_{2n}O)$ represents a mixture consisting of about 30 to about 75 weight percent, preferably about 50 weight percent of oxyethylene groups and about 70 to about 25 weight percent, preferably about 50 weight percent of oxypropylene groups wherein $x$ is an integer of at least 7; wherein $y$ is an integer of at least 4; wherein $d$ is an integer of at least 4, wherein the average molecular weight of each siloxane block ranges from about 500 to about 10,000, preferably about 500 to about 5000 and most preferably about 1000 to about 3500; wherein the average molecular weight of each polyoxyalkylene block ranges from about 300 to about 10,000, preferably about 1000 to about 5000 and most preferably about 2000 to about 3500; wherein the siloxane blocks constitute about 25 to about 50 weight percent, preferably about 30 to about 45 weight percent of the copolymer; wherein the polyoxyalkylene blocks constitute about 75 to about 50 weight percent, preferably about 70 to about 55 weight percent of the copolymer; and wherein the block copolymer has an average molecular weight of at least about 65,000, preferably at least about 100,000, up to about 350,000 or higher.

More specifically the above mentioned nonhydrolyzable (hydrolytically stable) linear siloxane-polyoxyalkylene block copolymers consist essentially or (A) at least four linear siloxane blocks consisting essentially of dihydrocarbylsiloxane groups; and (B) at least four linear polyoxyalkylene blocks, said siloxane blocks and polyoxyalkylene blocks being linked by silicon to carbon linkages; the average molecular weight of each siloxane block being from about 500 to about 10,000, the average molecular weight of each polyoxyalkylene block being from about 300 to about 10,000, the siloxane blocks constituting from about 20 to about 50 weight percent of the block copolymer, the polyoxyalkylene blocks constituting from about 80 to about 50 weight percent of the block copolymer and the block copolymer having an average molecular weight of at least about 30,000.

Thus, the preferred linear non-hydrolyzable siloxane-polyoxyalkylene block copolymers can be represented by the average formula $$([Y(R_2SiO)_aR_2SiYO][(C_nH_{2n}O)_y]_d$$

wherein R represents a monovalent hydrocarbon radical free from aliphatic unsaturation; n is an integer of from 2 to 4 inclusive; a is an integer of at least 6; y is an integer of at least 4; d is an integer of at least 4; Y represents a divalent organic group attached to the adjacent silicon atom by a carbon to silicon bond and to the polyoxyalkylene block by an oxygen atom; the average molecular weight of each siloxane block being from about 500 to about 10,000; the average molecular weight of each polyoxyalkylene block being from about 300 to about 10,000; said siloxane blocks constituting from about 20 to about 50 weight percent of the copolymer; the polyoxyalkylene blocks constituting about 80 to about 50 weight percent of the copolymer; and the block copolymer having an average molecular weight of at least about 30,000.

The exemplary radicals, as well as their preferred values, represented by R and ($C_nH_{2n}O$) in the above formula of said non-hydrolyzable block copolymers are the same as those previously defined above for the hydrolyzable copolymers. Of course it is understood that the chosen values of R, n, a, y and d must be such, that in any given block copolymer as defined herein, they coincide with the particular average weight values of the siloxane blocks, the polyoxyalkylene blocks and the copolymer itself.

As pointed out above, the linkage between the two different blocks is a divalent organic group attached to the adjacent silicon atom by a carbon to silicon bond and to the polyoxyalkylene block by an oxygen atom. Such linkages represented by Y above are readily apparent and determined by the reaction employed to produce the siloxane-polyoxyalkylene block copolymer. Illustrative of the divalent organic groups represented by Y in the above formula are such groups as

—R′—
—R′—CO—
—R′—NHCO—
—R′—NHCOHN—R″—NHCO—
—R′—OOCNH—R″—NHCO— and the like, wherein R′ is a divalent alkylene radical such as ethylene, propylene, butylene and the like; and R″ represents a divalent alkylene group, e.g. R′, or a divalent arylene group, e.g. —$C_6H_4$—; —$C_6H_4$—$C_6H_4$—;

—$C_6H_4$—$CH_2$—$C_6H_4$—

—$C_6H_4$—$CH(CH_3)_2$—$C_6H_4$— and the like, preferably R″ is a phenylene radical, i.e. —$C_6H_4$—. Illustrative of the more preferred examples of said divalent organic groups are —$CH_2CH_2$—;

—$CH_2CH_2CH_2$—; —$CH_2CH_2CH_2CH_2$—;

—$(CH_2)_2CO$—; —$(CH_2)_3NHCO$—;

—$(CH_2)_3NHCONHC_6H_4NHCO$—;

—$(CH_2)_3OOCNHC_6H_4NHCO$— and the like. Most preferably Y is a divalent alkylene group, especially —$CH_2CH_2CH_2$—.

The most preferred high molecular weight linear non-hydrolyzable siloxane-polyoxyalkylene block copolymers can be represented by the average formula:

$([Y(R_2SiO)_aR_2SiYO][(C_nH_{2n}O)_y])_d$ wherein R represents a monovalent hydrocarbon radical free from aliphatic unsaturation, preferably lower alkyl, especially methyl, wherein ($C_nH_{2n}O$) represents a mixture consisting of about 30 to about 75 weight percent, preferably about 50 weight percent of oxyethylene groups and about 70 to about 25 weight percent, preferably 50 weight percent of oxypropylene groups; wherein Y represents a divalent organic group attached to the adjacent silicon atom by a carbon to silicon bond and to the polyoxyalkylene block by an oxygen atom, preferably a divalent alkylene group having from 2 to 4 carbon atoms, especially —$CH_2CH_2CH_2$—; wherein a is an integer of at least 6; wherein y is an integer of at least 4, wherein d is an integer of at least 4; wherein the average molecular weight of each siloxane block ranges from about 500 to about 10,000 preferably about 500 to about 5000 and most preferably about 1000 to about 3500 wherein the average molecular weight of each polyoxyalkylene block ranges from about 300 to about 10,000, preferably about 1000 to about 5000 and most preferably about 2000 to about 3500; wherein the siloxane blocks constitute about 25 to about 50 weight percent, preferably about 30 to about 45 weight percent of the copolymer; wherein the polyoxyalkylene blocks constitute about 75 to about 50 weight percent, preferably about 70 to about 55 weight percent of the copolymer; and wherein the block copolymer has an average molecular weight of at least about 35,000 up to about 60,000.

The linear siloxane-polyoxyalkylene $(AB)_n$ copolymers employed as the cell-opening agents in the instant invention and methods for their preparation can be found more fully discussed in U.S. patent applications, Ser. Nos. 122,164, filed Mar. 8, 1971, now abandoned and 212,729, filed Dec. 27, 1971 and in the U.S. patent application, Ser. No. 252,332, filed May 10, 1972, entitled "Preparation of Siloxaneoxyalkylene Polymers," by B. Prokai and B. Kanner (D–8976). The amount of linear high molecular weight siloxane-oxyalkylene $(AB)_n$ copolymers employed in the process of the instant invention is not narrowly critical and the course need only be at least that amount that is sufficient to provide the polyurethane foam product with a closed-cell content of less than 50 percent. More preferably it is desired to employ that amount which is necessary to provide for rigid polyether polyurethane foam products having a closed-cell content of less than 20 percent and most preferably less than 10 percent. In general the amount of siloxane-oxyalkylene $(AB)_n$ copolymer open-cell agent should range from about 0.5 to 10 weight parts per 100 parts of the polyether polyol although lower or higher amounts may possibly be used.

In addition to the above described polyether polyols, organic polyisocyanates, catalysts, blowing agents and siloxane-polyoxyalkylene $(AB)_n$ copolymer cell-opening agents the polyurethane forming compositions may contain, if desired, other conventional additives such as diol foaming modifiers, e.g. ethylene glycol, polyethylene glycol and the like; crosslinking agents, e.g. pentaerythitol, glycerol, N,N,N′,N′-tetrakis(2-hydroxypropyl) ethylene diamine, and the like; foam stabilizers, such as siloxane-polyoxyalkylene copolymers outside of the scope of the siloxane-oxyalkylene $(AB)_n$ copolymer cell-opening agents defined herein. Illustrative of such conventional foam stabilizers are those of the general formula

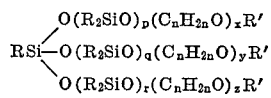

and the copolymers of the general formula

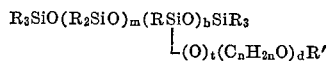

wherein R is a monovalent hydrocarbon radical, R′ is hydrogen or a monovalent hydrocarbon radical, ($C_nH_{2n}O$)

is an oxyalkylene radical or mixtures of such radicals, p, q, r, x, y, z, b and d are positive integers, m and t are 0 or a positive integer, and n is an integer of at least two, and the like; thermal stabilizers, e.g. d-tartaric acid, t-butyl catechol, and the like; plasticizers, e.g. di-octyl phthalate and the like; flame retardants, e.g. organo phosphorus or halogen compounds or organic halophosphorus-containing compounds, or inorganic compounds, e.g. antimony oxide, and the like; scorch inhibitors, e.g.

phenothiazine, alkylene oxides such as propylene oxide, and the like; fillers, pigments, dyes, antioxidants, antiozonants, deodorants, fungicides, and the like. Minor amounts of conventional cell-opening agents e.g. an alkali metal salt of an alpha substituted higher fatty acid, and the like can also be employed, if desired. It is of course understood that such additional ingredients are not required by the instant invention.

Thus the final foam-forming formulations of this invention contain a major amount of (1) a polyether polyol (or mixture of such polyethers) and (2) an organic polyisocyanate (or mixture of organic isocyanates), (3) a catalytic amount of a catalyst (or mixture of catalysts), (4) a minor amount of a blowing agent (or mixture of blowing agents), and (5) a minor amount of a siloxanepolyoxyalkylene $(AB)_n$ copolymer cell-opening agent in an amount sufficient to provide the foam product with less than a 50 percent closed-cell content, along with (6) optional ingredients, if desired. The foam-forming formulation contains all of the above ingredients regardless of the order of mixing in the process steps which precede the foam developing reaction. As pointed out the final combination of ingredients is independent of the process (one-shot, semi-prepolymer or prepolymer) even though the order of addition or partial reactions between some ingredients may differ from one process to another. The preferred one-shot process for producing the rigid polymer polyurethane foam generally comprises the steps of (1) forming at a temperature of about 15° C. to 50° C. a mixture comprising the polyether polyol, catalyst siloxane-oxyalkylene $(AB)_n$ copolymer cell-opening agent, blowing agent and organic polyisocyanate, (2) pouring the reaction mixture into a suitable mold and (3) allowing the mixture to foam and cure by itself. Of course it is understood that the steps are not critical and that the foaming reaction may be commenced and completed in the mold. Moreover, while the reaction is generally sufficiently exothermic enough to provide sufficient heat to cure itself, the reaction mixture may be externally heated and the foam post cured, if desired, although such is not normally practiced.

The production of predominately open-cell rigid polyether polyurethane foam by employing the siloxaneoxyalkylene $(AB)_n$ copolymers as defined herein as the cell-opening agents is indeed unique and surprising since other types of siloxane-oxyalkylene copolymers have been heretofore used as foam stabilizers and found to increase the closed-cell content of the foams. In addition the process of the instant invention has been found to provide open-cell rigid polyether polyurethane foam having good thermal stability against cold shrinkage and heat-defamation and low densities. Moreover, the instant process does not require the use of conventional silicone polymer foam stabilizers nor the use of mechanical processing, e.g. the use of an applied vacuum or oven treatment to enhance cell opening. Furthermore, since no solids are involved the settling of solids in the resin-premix with resulting non-uniform foam is obviated as is the plugging of lines and nozzles on a foam machine which might be caused by solid particles. The elimination of additional procedural steps renders possible the formation of large blocks of foam and renders the final foam product more suitable for foam-in-place applications.

The open-cell rigid polyether polyurethane foam products of this invention have utility in a wide variety of fields as is well known in the art. For example, they can be used for filtration purposes, such as gas, liquid and/or air filters, and the like; for sound proofing or absorbing purposes, such as sound dampers, acoustical tiles, and the like; for insulation purposes such as cryogenic insulation, steam pipe insulation, as the component of a sandwich panel for building construction, and the like, and in many other obvious areas too numerous to mention.

The closed cell content as defined herein and given in the following examples is measured according to the method proposed by W. T. Remington et al. described in Rubber World, May 1958, p. 261 using a Beckman Air Comparison Pycnometer, Model 930 as shown in the article by D. M. Rice et al. in the SPE Journal, March 1962, page 321. The pycnometer apparatus measures the volume of air displaced when a foam specimen is placed into a closed chamber. The volume of displaced air represents the space occupied by the closed cells of the foam plus the volume of the cell walls themselves (polymer volume), which can be calculated and substracted. The apparatus contains two confined chambers whose volumes can be changed by moving pistons. The chambers are separated from each other by a differential pressure gauge, so that a zero pressure differential can be determined. The foam sample is placed in one of these chambers. The other chamber is the reference chamber. During the course of the measurement, the foam sample is first subjected to a vacuum of 0.5 atmosphere in order to establish a reference volume, and then the pressure in both chambers is brought back to 1.0 atm. by moving the chamber pistons. A volume reading is then obtained. Thus the volume percent closed-cell content of the foam can be defined by the equation Percent closed cells $$= \frac{\Delta V - \left(\frac{\text{Wt. of sample, grams}}{\text{Specific gravity of polymer}}\right)}{\text{Volume of sample, cc.}} \times 100$$

where $\Delta V$ is the instrument reading volume of air displaced by the foam sample.

The percentage of open-cells (open-cell content of the foam) is then of course determined merely by subtracting the obtained closed-cell content from 100.

As defined herein, the molecular weights for the various linear $(AB)_n$ polymer compositions of this invention and those given in the following examples were measured by Gel Permeation Chromatography using a calibration curve showing the relationship between the respective elution volumes established by dimethylsiloxane fluid of different molecular weights and the respective known molecular weights of such fluids. In establishing the calibration curve, the various dimethylsiloxane fluids were in solution in trichloroethylene solvent using styragel packed columns. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. The use of Gel Permeation Chromatography for measuring molecular weights is discussed in "Polymer Fractionation" (ed. Manfred J. R. Cantow, Academic Press, Inc. New York, 1967), pp. 123–173, Chapter B4, entitled, "Gel Permeation Chromatography," by K. H. Altgelt and J. C. Moore.

In the following examples the procedure described in the article entitled "Characterization of Silicones by Gel Permeation Chromatography," by F. Rodriguez et al. in I & EC Product and Development, vol. 5, No. 2, p. 121, June 1966 was followed using five styragel packed columns (Waters Associates, Inc.) having a pore size of $3 \times 10^3$ A., $10^4$ A., $10^5$ A., $3 \times 10^5$ A. and $10^6$ A., respectively.

The following examples illustrate the present invention and are not to be regarded as limitative. It is to be understood that $\phi$ represents a phenylene radical ($-C_6H_4-$); Me represents a methyl radical; GPC designates Gel Permeation Chromatograph; that the closed-cell content was measured as explained above using identical size samples; and that all of the parts, percentages and proportions referred to herein and in the appended claims are by weight unless otherwise indicated.

Example 1

In a one quart container about 100 parts (157.0 grams) of a polyether polyol mixture consisting of about 40 parts of a phenol/aniline/formaldehyde-(propylene oxide)(ethylene oxide) polyol having about 88% propylene oxide, about 12% ethylene oxide, a molecular weight of about 1032 and a hydroxyl number of about 320, about 40 parts of a sorbitol-propylene oxide polyol having a molecular weight of about 620 and a hydroxyl number of about 490, about 4 parts of dipropylene glycol, about 16 parts of a flame retardant,

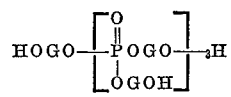

wherein G is a —CH(CH$_3$)CH$_2$OCH$_2$CH(CH$_3$)— radical, and about 0.2 part of a scorch inhibitor, phenothiazine; and about 0.6 part (0.942 gram of 092 cc.) of an amine catalyst, triethylene diamine (33 percent in dipropylene glycol); about 2.0 parts (3.14 grams) of a foam stabilizer, a siloxane-oxyalkylene copolymer having the average formula

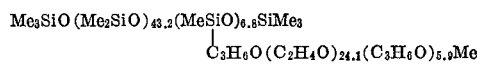

and about 36 parts (56.5 grams) of a blowing agent, trichlorofluoromethane, were blended at room temperature with a spatula. The container with its contents were placed on a drill press fitted with a three-blade, marine type propeller (speed set at 2000 r.p.m.) and further blended for ten seconds. About 0.5 part (0.785 gram or 0.62 cc.) of a tin catalyst, stannous octoate, were then added and mixed for about 5 seconds. While stirring, about 100 parts (157.0 grams) of an aniline/formaldehyde/isocyanate condensation product, a poly(phenylpolymethylene)polyisocyanate having the average formula

 (9.37 Index, 31.5% free NCO)

were added and mixed for five seconds after addition was complete. An exotherm commenced and the foaming reaction mixture was poured into an 8 x 8 x 6 inch box and allowed to cure by itself.

In less than about 5 minutes a tack-free rigid polyether polyurethane foam product was obatined which had a density of about 1.70 pounds per cubic inch, a closed-cell content of about 88.3 percent and exhibited 38.3 volume percent cold shrinkage at —15° C.

Example 2

The procedure of Example 1 was repeated using the same ingredients and amounts except that no siloxane-oxyalkylene copolymer foam stabilizer was employed.

The tack free rigid polyether polyurethane foam product obtained had a density of about 1.89 pounds per cubic foot, and a closed-cell content of about 64.3 percent.

Example 3

The procedure of Example 1 was repeated using the same ingredients and amounts except that 2.0 parts (3.14 grams) of a siloxane-oxyalkylene (AB)$_n$ copolymer cell-opening agent (a 50:50% solution in xylene) having the average formula

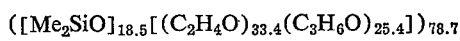

and a GPC molecular weight of about 340,000 was employed instead of the siloxane foam stabilizer of Example 1.

The tack-free rigid polyether polyurethane foam product obtained had a density of about 2.61 pounds per cubic foot, and a closed cell content of 0.0 percent.

Example 4

The procedure of Example 3 was repeated using the same ingredients and amounts except that about 43 parts (67.5 grams) of the trichlorofluoromethane blowing agent was used.

The tack-free rigid polyether polyurethane foam product obtained had a density of about 2.21 pounds per cubic foot, and a closed-cell content of 0.0 percent.

Example 5

The procedure of Example 4 was repeated using the same ingredients and amounts except that about 50 parts (78.5 grams) of the trichlorofluoromethane blowing agent was used.

The tack-free rigid polyether polyurethane foam product obtained had a density of about 1.95 pounds per cubic foot, a closed-cell content of 0.0 percent and exhibited 0.0 volume percent cold shrinkage at —15° C.

Example 6

20,000 grams of a mixture consisting of about 100 parts of the polyether polyol of Example 1, about 0.6 part of an amine catalyst, N,N,N$^1$,N$^1$-tetramethyl-1,3-butane diamine and about 35 parts of trichlorofluoromethane blowing agent was added to a five gallon container. Using a propeller blade mixer, about 1.0 part (147.5 grams of a foam stabilizer, the siloxane-oxyalkylene copolymer of Example 1 and about 0.2 part (29.5 grams) of a tin catalyst, stannous octoate, were blended with the mixture for ten minutes. This resin premixture and a five gallon container of the polyisocyanate of Example 1 were connected to the feed lines of a Martin-Sweets foam machine. The feed rates were adjusted so that about 136.8 parts (251 grams) of the resin premix and about 103 parts (184 grams) of the polyisocyanate were added to the mixing head in a three second interval to give a throughput of 19 pounds of foam mixture per minute. With the machine mixer speed at 6000 r.p.m. and with an air bleed to the mixer head the foam formulation was mixed in the machine and poured into a 12" x 12" x 12" cardboard box and allowed to cure.

The tack-free rigid polyether polyurethane foam product obtained had a density of 1.82 pounds per cubic foot and a closed-cell content of 91.6 percent.

Example 7

The procedure in Example 6 was repeated using the same ingredients and amounts except that about 2.0 parts (295 grams) of a siloxane-oxyalkylene (AB)$_n$ copolymer cell opening agent (a 50:50% solution in xylene) having the average formula

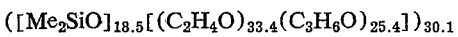

a GPC molecular weight of about 130,000 and about 37.5 wt. percent silicone based on wt. percent of starting siloxane used to make said copolymer was employed instead of the siloxane foam stabilizer of Example 6.

The tack-free rigid polyether polyurethane foam product obtained had a density of about 2.07 pounds per cubic foot, and a closed-cell content of 0.0 percent.

Example 8

The procedure in Example 7 was repeated using the same ingredients and amounts except that a siloxane-oxyalkylene (AB)$_n$ copolymer cell-opening agent having the average formula

a GPC molecular weight of about 90,000 and about 34.3 wt. percent silicone based on wt. percent of starting siloxane used to make said copolymer was employed.

The tack-free rigid polyether polyurethane foam product obtained had a density of about 2.17 pounds per cubic foot, and a closed-cell content of 0.0 percent.

Example 9

The procedure in Example 7 was repeated using the same ingredients and amounts except that a siloxane-oxyalkylene $(AB)_n$ copolymer cell-opening agent having the average formula $$([Me_2SiO]_{18.5}[(C_2H_4O)_{33.4}(C_3H_6O)_{25.4}])_{78.7}$$

a GPC molecular weight of about 340,000 and about 32.0 wt. percent silicone based on wt. percent of starting siloxane used to make said copolymer was employed.

The tack-free rigid polyether polyurethane foam product obtained had a density of about 2.12 pounds per cubic foot, and a closed-cell content of 0.0 percent.

Example 10

The procedure in Example 7 was repeated using the same ingredients and amounts that a siloxane-oxyalkylene $(AB)_n$ copolymer cell-opening agent having the average formula $$([Me_2SiO]_{18.5}[(C_2H_4O)_{33.4}(C_3H_6O)_{25.4}])_{23.2}$$

a GPC molecular weight of about 100,000 and about 38.0 wt. percent silicone based on wt. percent of starting siloxane used to make said copolymer was employed.

The tack-free rigid polyether polyurethane foam product obtained had a density of about 2.29 pounds per cubic foot, and a closed-cell content of 0.0 percent.

Example 11

The procedure of Example 1 was repeated using the same ingredients and amounts except that about 35 parts (55 grams) of the trichlorofluoromethane blowing agent, about 103 parts (161.7 grams) of the polyisocyanate component, and about 2.0 (3.14 grams) of the siloxane-oxyalkylene $(AB)_n$ copolymer cell-opening agent of Example 3 were employed.

The tack-free rigid polyether polyurethane foam product obtained had a density of about 2.4 pounds per cubic foot, and a closed-cell content of 0.0 percent.

Example 12

The procedure of Example 11 was repeated using the same ingredients and amounts except that dibutyltindilaurate was used instead of stannous octoate as the tin catalyst.

The tack-free rigid polyether polyurethane foam product obtained had a density of about 2.4 pounds per cubic foot, and a closed-cell content of 0.0 percent.

Example 13

The procedure of Example 11 was repeated using the same ingredients and amounts except that $N,N,N^1,N^1$-tetramethyl-1,3-butane diamine was used as the amine catalyst and about 0.2 part (0.314 gram) of the stannous octoate tin catalyst was used.

The tack-free rigid polyether polyurethane foam product obtained had a density of about 2.1 pounds per cubic foot, and a closed-cell content of 0.0 percent.

Example 14

The procedure of Example 11 was repeated using the same ingredients and amounts except that the tin catalyst was omitted from the foam formulation.

The tack-free rigid polyether polyurethane foam product obtained had a density of about 2.4 pounds per cubic foot, and a closed-cell content of 0.0 percent.

Example 15

The procedure of Example 1 was repeated using the same ingredients and amounts except that a siloxane-oxyalkylene $(AB)_n$ copolymer cell-opening agent having the average formula $$([Me_2SiO]_{18.5}[(C_2H_4O)_{33.4}(C_3H_6O)_{25.4}])_{16.4}$$

a GPC molecular weight of about 71,000 and about 34.2 wt. percent silicone based on wt. percent of starting siloxane used to make said copolymer was employed.

The tack-free rigid polyether polyurethane foam product obtained had a density of about 2.61 pounds per cubic foot and a closed-cell content of 0.0 percent.

Example 16

The procedure of Example 1 was repeated using the same ingredients and amounts except that a siloxane-oxyalkylene $(AB)_n$ copolymer cell-opening agent having the average formula $$([Me_2SiO]_{18.5}[(C_2H_4O)_{33.4}(C_3H_6O)_{25.4}])_{7.87}$$

a GPC molecular weight of about 34,000 and about 34.2 wt. percent silicone based on wt. percent of starting siloxane used to make said copolymer was employed.

The tack-free rigid polyether polyurethane foam product obtained had a density of about 1.84 pounds per cubic foot and a closed-cell content of 84.3 percent.

Example 17

The procedure of Example 1 was repeated using the same ingredients and amounts except that a siloxane-oxyalkylene $(AB)_n$ copolymer cell-opening agent having the average formula $$([Me_2SiO]_{19.7}[(C_2H_4O)_{45.7}(C_3H_6)_{11.6}])_{30.9}$$

a GPC molecular weight of about 128,000 and about 36.6 wt. percent silicone based upon wt. percent of starting siloxane used to make said copolymer was employed.

The tack-free rigid polyether polyurethane foam product obtained had a density of about 1.99 pounds per cubic foot and a closed-cell content of 10.4 percent.

Examples 3–5, 7–15 and 17 demonstrate that predominately open-cell rigid polyether polyurethane foam can be prepared when a siloxane-polyoxyalkylene $(AB)_n$ copolymer cell-opening agent within the scope of the instant invention is employed, while Examples 1, 2, 6 and 16 demonstrate the high closed-cell content of the same foam obtained when said cell-opening agent is not employed.

Various modifications and variations of this invention will be obvious to a worker skilled in the art and it is to be understood that such modifications and variations are to be included within the purview of this application and the spirit and scope of the appended claims.

I claim:
1. A process for producing an open-cell rigid polyether polyurethane foam having a closed cell content of less than 50 percent which comprises foaming and curing a reaction mixture comprising:
   (a) a polyether polyol having an average molecular weight of about 200 to about 1500 and a hydroxyl number of about 200 to about 1000;
   (b) an organic polyisocyanate, said polyether and polyisocyanate, taken together, being present in the mixture in a major amount and in the relative amount required to produce the polyurethane;
   (c) a blowing agent in a minor amount sufficient to foam the reaction mixture;
   (d) a catalytic amount of an catalyst for the production of the polyurethane from the polyether and the polyisocyanate; and
   (e) as the cell-opening agent a minor amount of a hydrolyzable $(AB)_n$ block copolymer having the average formula:

$$[(R_2SiO)_x(C_nH_{2n}O)_y]_d$$

wherein R represents a monovalent hydrocarbon radical containing from 1 to 20 carbon atoms and free from aliphatic unsaturation; $n$ is an integer of 2 to 4 inclusive; $x$ is an integer of at least 7; $y$ is an integer of at least 4; $d$ is an integer of at least 4; the average molecular weight of each siloxane block ranges from about 500 to about 10,000; the average molecular weight of each polyoxyalkylene block ranges from about 300 to about 10,000; the siloxane blocks constitute from about 20 to about 50 weight percent of the copolymer; the polyoxyalkylene blocks constitute about 80 to about 50 weight percent of the copolymer; and the block copolymer has an average molecular weight of at least about 65,000; said amount of cell-opening agent being sufficient to provide the polyurethane foam with a closed-cell content of less than 50 percent.

2. A process as defined in claim 1, wherein the siloxane-oxyalkylene block copolymer cell-opening agent has an average molecular weight of at least about 100,000 and where R represents methyl radical.

3. A process as defined in claim 2, wherein $(C_nH_{2n}O)$ represents a mixture consisting of about 30 to 75 weight percent of oxyethylene groups and about 70 to 25 weight percent of oxypropylene groups; wherein the siloxane blocks constitute about 20 to about 50 weight percent of the copolymer and the polyoxyalkylene blocks constitute about 75 to about 50 weight percent of the copolymer; and wherein the average molecular weight of each siloxane block ranges from about 500 to about 5000 and the average molecular weight of each polyoxyalkylene block ranges from about 1000 to about 5000.

4. A process as defined in claim 2, wherein in the hydrolyzable siloxane-polyoxyalkylene the siloxane blocks constitute about 30 to about 45 weight percent of the copolymer and the polyoxyalkylene blocks constitute about 70 to about 55 weight percent of the copolymer; wherein the average molecular weight of each siloxane block ranges from about 1000 to about 3500 and wherein the average molecular weight of each polyoxyalkylene block ranges from about 2000 to about 3500; and wherein $(C_nH_{2n}O)$ represents a mixture constituting about 50 weight percent of oxyethylene groups and about 50 weight percent of oxypropylene groups.

5. A process as defined in claim 2, wherein the polyether polyol has an average molecular weight of about 250 to about 800 and a hydroxyl number of about 300 to about 600.

6. A process as defined in claim 5, wherein the organic polyisocyanate is a poly(phenylmethane) polyisocyanate.

7. A process as defined in claim 5, wherein the polyether polyol comprises a mixture of two or more different polyether polyols.

8. A process as defined in claim 5, wherein the blowing agent is selected from the group consisting of water and halofluorocarbon compounds.

9. A process as defined in claim 8, wherein the blowing agent is trichlorofluoroethane.

10. A process as defined in claim 5, wherein the catalyst is selected from the group consisting of tertiary amine compounds, organo-tin compounds, and mixtures thereof.

11. A process as defined in claim 10, wherein the catalyst is a mixture of a tertiary amine compound and an organo-tin compound.

12. A process as defined in claim 2, wherein the siloxane-oxyalkylene $(AB)_n$ copolymer cell-opening agent employed is sufficient to provide the polyurethane foam with a closed-cell content of less than 20 percent.

13. A process as defined in claim 12 which comprises foaming and curing the reaction mixture in a single step.

14. A process as defined in claim 5, wherein the reaction mixture contains a flame retardant as an additional ingredient.

References Cited

UNITED STATES PATENTS

| | | | |
|---|---|---|---|
| 3,600,418 | 8/1971 | Bailey | 260—2.5 AH |
| 3,480,583 | 11/1969 | Bailey | 260—46.5 R |
| 3,454,504 | 7/1969 | Murai | 260—859 |
| 3,433,752 | 3/1969 | Zagoren | 260—2.5 AG |
| 2,917,480 | 12/1959 | Bailey | 260—825 |

FOREIGN PATENTS

| | | | |
|---|---|---|---|
| 1,015,611 | 1/1966 | Great Britain | 260—2.5 AH |
| 688,333 | 6/1964 | Canada | 260—2.5 AH |
| 1,165,280 | 9/1969 | Great Britain | 260—2.5 AH |

DONALD E. CZAJA, Primary Examiner

C. W. IVY, Assistant Examiner

U.S. Cl. X.R.

260—2.5 AP, 2.5 AQ